United States Patent [19]

Hutchison

[11] Patent Number: 4,508,426

[45] Date of Patent: Apr. 2, 1985

[54] LOCKING MEANS FOR SOLAR COLLECTOR

[76] Inventor: Joseph A. Hutchison, 3300 Century Cir., Irving, Tex. 75060

[21] Appl. No.: 494,047

[22] Filed: May 12, 1983

[51] Int. Cl.³ .............................................. G02B 7/18
[52] U.S. Cl. .................................. 350/614; 126/418; 350/632
[58] Field of Search .............. 350/296, 293, 292, 288; 126/418

[56] References Cited

U.S. PATENT DOCUMENTS 4,178,913 12/1979 Hutchison ........................... 350/293
4,247,182 11/1981 Smith ................................... 126/418
4,284,061 8/1981 Wildenrotter ....................... 126/418

*Primary Examiner*—Jon W. Henry
*Attorney, Agent, or Firm*—Gerald G. Crutsinger; John F. Booth; Monty L. Ross

[57] ABSTRACT

A locking mechanism for holding reflector elements of a solar collector array in a position protected from high wind and storm damage including locking bar means mounted between and rotating with pairs of reflectors, latching means mounted on support pylons between said reflectors and positioned to engage and hold said locking bar means thereby retaining the reflectors in the protected position, and a plurality of linked release means for simultaneous release of all said latching means.

12 Claims, 3 Drawing Figures

LOCKING MEANS FOR SOLAR COLLECTOR

This invention relates to protective devices for solar collection systems and more particularly to a locking system to secure large solar collectors or arrays of collectors in a position where they are least susceptible to damage from high winds or violent weather conditions.

BACKGROUND OF THE INVENTION

Recent economic and political developments have caused an increased interest in various energy sources not previously explored or exploited on a commercial basis. One particularly promising alternative source of energy is the recovery and use of solar radiation or solar energy. Many types of solar energy conversion systems have been investigated. One of the more promising systems uses parabolic trough reflectors to concentrate the solar energy received from large area receptors in a relatively small utilization area.

Some of the most effective solar energy collectors utilize a relatively large reflector surface that is formed by constructing an elongated trough-like means with the walls of the trough having a constant parabolic shape whereby the focal points of the parabolas of the trough lie along a relatively straight line above the trough. The concave parabolic trough solar collector can be equipped with a target or energy receiver that is disposed along the line formed by the locus of focal points of the parabolic reflector. By using such a reflector means, solar radiation striking the concave surface of the solar collector will be reflected and concentrated on the focal point locus of the parabolas. The reflected radiation is captured by energy receivers located at or near the focal point locus of the parabolic surfaces.

In order to maximize the amount of solar energy that can be captured using reflector-type solar collectors, it has been found highly desirable to utilize movable solar reflector-collectors. By using the movable solar reflector-collectors as opposed to stationary collectors, the efficiency of the solar collector system can be greatly increased. Thus, the use of movable solar reflector-collectors that can be effectively aimed at the sun will greatly increase the overall energy recovery efficiency of the entire system. In the case of parabolic trough reflector solar collectors, maximum energy recovery is obtained when the axes of the parabolas of the trough walls are aimed directly at the sun. However, systems using such large movable reflector troughs are susceptible to damage from severe weather unless designed structurally to withstand weather conditions of an arbitrarily chosen high degree of severity. But often, construction of a movable reflector-collector system and its supporting structures designed to withstand weather of great severity while in any of the system operational positions is prohibitively expensive.

Many movable dish collector systems now provide means by which the collector trough or troughs can be quickly moved to a position in which they are least susceptible to damage when threatening weather conditions are detected. Nevertheless, even though the collector reflectors themselves may be to a large extent protected from damage by such positioning, it has been found that the motive drive system may sustain severe damage if it is subjected to the stress of maintaining the reflectors in their "protected" position during the periods of severe weather.

SUMMARY OF THE INVENTION

According to the present invention, a latch mechanism locks the reflector troughs of the collector in their protected position after the troughs have been moved to that position by the motive-drive system used for other positioning maneuvers of the reflectors. The latch mechanism latches and locks to a locking bar attached directly to the edge of the trough. The holding force of the latch mechanism is thus applied through a relatively long lever arm directly to the dish itself rather than through the rotation axle of the reflector. The rotation axle is in effect an extremely short lever arm which, if locked against reflector rotation, would be subjected to extremely high torques resulting from forces against the reflector generated by storms and high winds. The latch itself is a spring-loaded centrally pivoted lever member having an inclined cam surface or edge on its front side by means of which a locking bar attached to the reflector cams the latch to the "open" position as the reflector is moved to the "protected" position. The underside of the lever member has a notch with a slight "lip" extending rearwardly. Thus, as the locking bar passes the lever member, it is pulled by a bias spring back to its closed position capturing and holding the locking bar in the notch and the reflector in its protected position. A solenoid operated linkage system is provided to release the latch mechanism when desired.

It is an object of the present invention to provide a strong and simply operated latch system to lock solar collector reflectors and/or arrays automatically in a "protected" position.

It is a further object to provide a latching and locking system for solar collector reflectors adapated for the simultaneous release of all the latches in a long collector array.

It is a still further object to provide a latching and locking system to hold movable reflectors of solar collector systems in a protected position against severe external forces without overstressing the collector motive system.

BRIEF DESCRIPTION OF THE DRAWINGS

These and other objects and advantages of the present invention will become apparent from the following detailed description of a preferred embodiment when read with reference to the accompanying drawings wherein.

DESCRIPTION OF A PREFERRED EMBODIMENT

Figure 1:
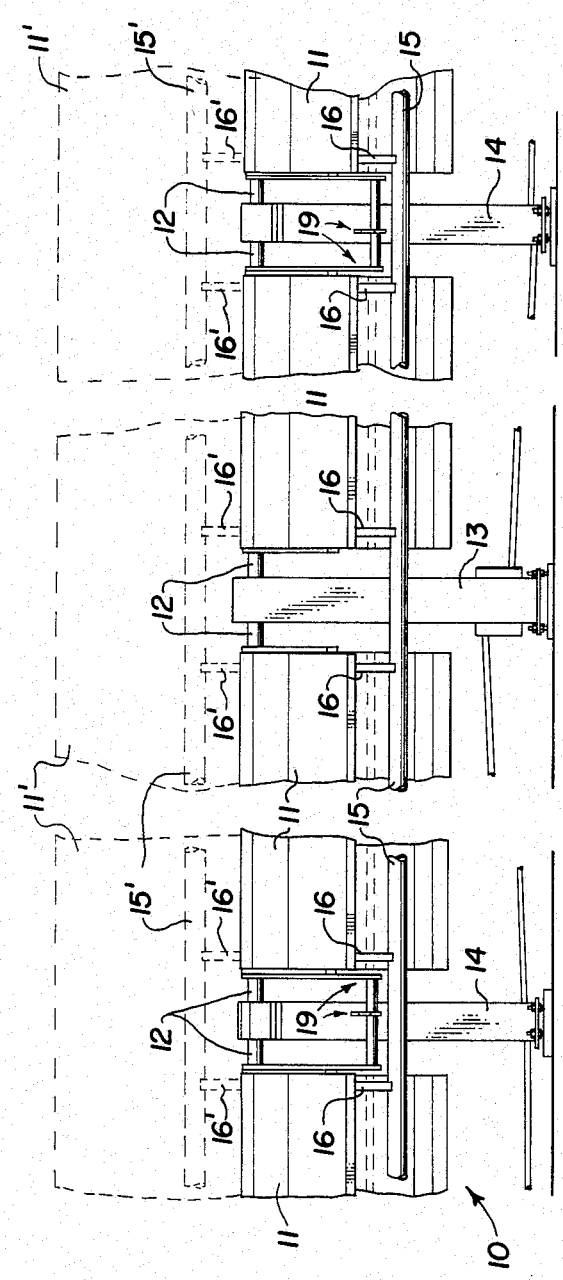
FIG. 1 is a (fragmented) front elevation of a movable reflector solar collector array of a type with which the present invention finds exceptional utility and illustrating the reflectors in their protected and in their operational positions.

Referring now to the drawings and in particular to FIG. 1, there is shown in fragmented front elevation a movable reflector solar energy collector array 10 of the type now well known. Such collector arrays are described and illustrated in detail in U.S. Pat. Nos. 4,306,504, 4,297,003, and 4,138,943, among others, and therefore only essential features of the array are shown and described herein. Collector arrays of this type are comprised generally of a plurality of trough-like reflector "dishes" 11 with front reflective surfaces which in cross section follow a parabolic curve. The reflectors 11 are rotatably mounted on axle members 12 extending from pylon supports 13 and 14. The reflectors 11 of such a system may be, for example, about 21 feet long with an aperture of about 21 feet across as in one currently operating system. An energy receiver 15, usually in the form of a pipe-like or tubular member is mounted on struts 16 extending from the reflectors 11 in the vicinity of the rotation axles 12 and is positioned to lie along the lines of focus of the reflector parabolas, usually for the full length of the array. Thus, solar energy striking the dishes 11 will be reflected and concentrated at the receiver 15.

For most efficient reception of solar energy, arrays of this type are usually constructed aligned in a generally north-south direction. The reflectors 11 are pivoted about their axles 12 and maneuvered to point at and follow the sun while they are in use so that they will receive maximum solar radiation at all times. In FIG. 1, the dashed lines and primed reference numbers show the reflectors in an "operational" position. Movements of the reflectors 11 are ordinarily produced by motors geared to rotate the axles 12 which are coupled to the reflectors 11 in various ways. Because of the large area of solid surface presented by the reflectors 11 in their operational positions, the collectors are subject to large wind stresses and when winds exceed about 30 miles per hour, it has been found advisable to suspend operations of the array and rotate the reflectors 11 to a position offering least wind resistance, i.e., a "protected" position. This position is as shown in solid lines in FIG. 1 with the axis of the reflector parabola pointed generally downward towards the ground. Although wind stresses are least when the reflectors 11 are in such "protected" position they are still substantial, especially with high gusts and in storms. If the maneuvering or drive mechanism is merely locked in place to hold the reflector in the protected position, the stress forces are concentrated in the axles 12 and the gear drive from the motor. The concentrated forces can easily produce failure of these members unless they are overdesigned to withstand forces many times those produced by the ordinary operational stresses encountered. Thus, the locking system of the present invention, as seen in greater detail in FIGS. 2 and 3, removes the stress forces from the axle members 12 by attaching directly to the reflectors 11 near their edges and by taking advantage of an extended lever arm to reduce the holding force required.

Figures 2, 3:
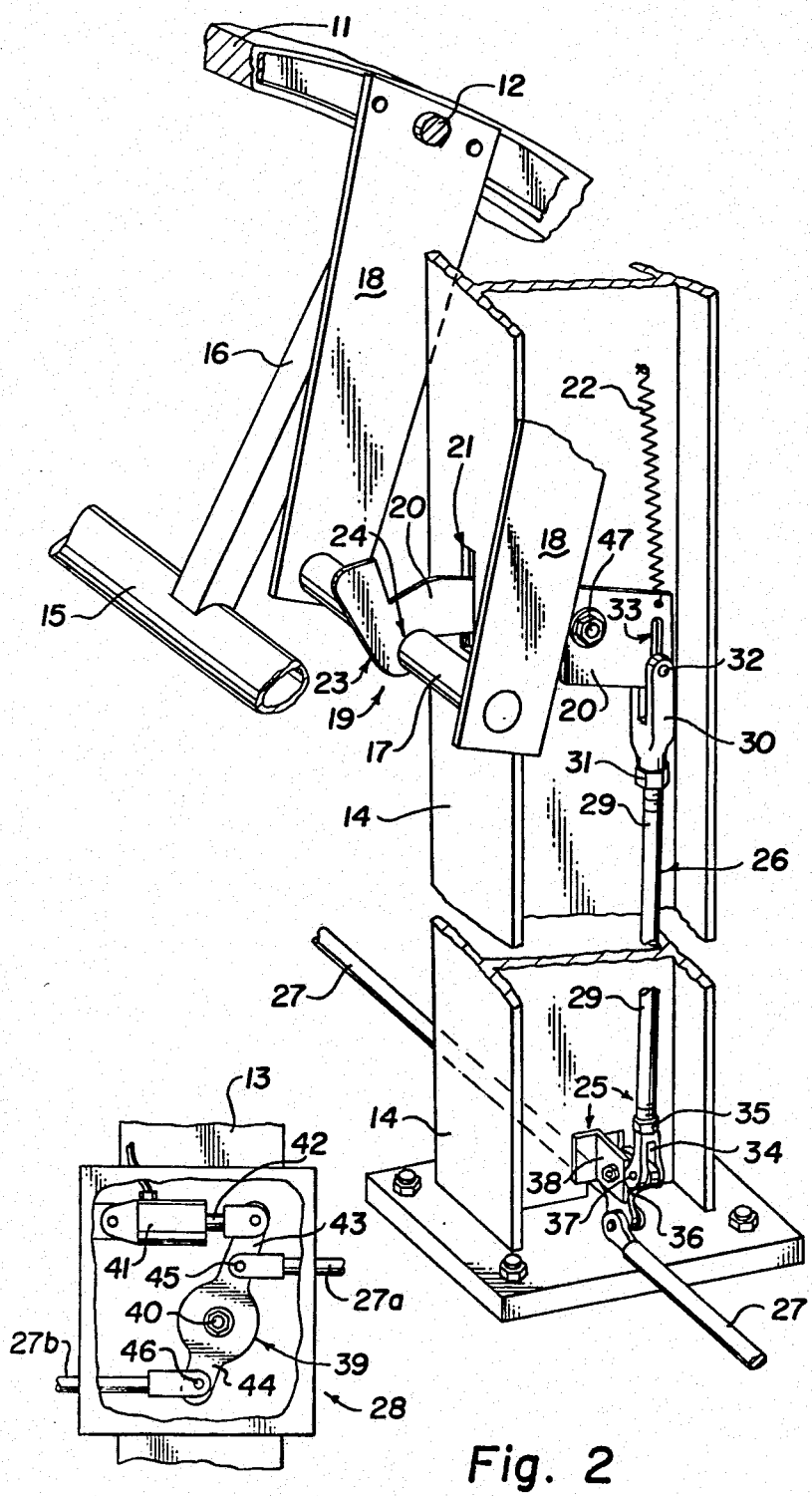
FIG. 2 is a perspective view (fragmented) of the latching mechanism of the present invention as installed and positioned on a support pylon of the collector array of FIG. 1.
FIG. 3 illustrates the release mechanism of the present invention in rear view.

As seen in FIG. 2, a locking bar 17 is affixed to and between each pair of reflectors 11. The locking bar 17 is mounted between a pair of mounting plates 18 extending from the side edges of the reflectors 11. The locking bar 17 may be bolted between the plates or otherwise secured to them as by being "staked" or welded as shown. The mounting plates 18 are bolted or otherwise secured to the edges of the reflectors 11 on either side of the axle 12. These mounting plates 18 should be of an appropriate length so that when the locking bar 17 is in the latched position close to the support pylon 14, the reflector dish is downwardly pointed with the receiver tube held close to but not in contact with the support pylons 14. Thus, the reflectors 11 are positioned in substantially the best position to be least adversely affected by high winds, i.e., pointing almost directly toward the ground.

The latch 19 holding the locking bar 17 and reflectors 11 in the protected position comprises a lever arm 20 pivotally mounted to the support pylon 14 such as by bolt 47 at a point between its ends. Preferably, the lever arm 20 is flat and extends through a slot-like opening 21 in the pylon 14 to engage the locking bar 17. The lever 20 is biased toward the locked position (counterclockwise in the drawing) by a spring member 22. Lever 20 is limited in its pivotal movement by the ends of the slot 21. The front edge 23 of the lever 20 is inclined such that when contacted by the locking bar 17 as the reflectors 11 to which it is connected are moved to the downward pointing position, the lever arm 20 is pushed up and out of the path of the locking bar 17.

Toward the front end of the lever arm 20 at its lower edge, there is formed a notch 24. Thus, as the locking bar 17 passes under the front edge 23 of the lever arm to the notch 24 the spring 22 pulls the rear end of the arm 20 up and the front end down to catch and lock the locking bar 17 in the notch 24 as shown.

Ordinarily several support pylons 14 in the array are equipped with a locking mechanism 16 so that each reflector 11 of the array is adequately secured when moved to the protected position. Therefore, a central release mechanism is provided to release all the locking mechanisms of the array simultaneously.

The release mechanism 25 comprises a multi-element linkage with a vertical arm 26 coupled to each latch lever arm 20 and a plurality of horizontal links 27 coupled to the vertical arms 26 and to an actuator mechanism 28. As best shown in FIG. 2 each vertical arm 26 comprises a metal rod or bar 29 threaded at its ends. A "U" shaped connector yoke 30 is threaded on the upper end of the bar 29 and adjustably secured in place by a locking nut 31. The bar 29 is coupled to the latch lever 21 by a pin 32 passed through the yoke tines and a slot 33 in the rear portion of the lever arm 20. The pin 32 may be held in place by a cotter pin (not shown) or other conventional means. The slot 33 allows the lever arm 20 to be pivoted clockwise by the locking bar 11 free of the vertical linkage arm bar 26 while still providing immediate operation of the lever arm 20 by downward movement of the vertical arm 26.

A "U" shaped connector yoke 34 also is threaded to the lower end of the vertical bar 29 and adjustably secured in place by a lock nut 35. The connector yoke 34 is pivotally attached to a bell crank 36 by a pin 37 secured similarly to the upper arm pin 32. The bell crank 36 is attached for pivotal movement on a bracket 38 secured to the support pylon 14. Horizontal linkage arms 27 interconnect similar bell crank and vertical arm structures on the other pylons 14 of the array to provide simultaneous activation of all the release mechanisms.

The release actuator mechanism 28 as shown in FIG. 3, is a solenoid operated double-armed pivot crank. Double-armed crank member 39 is mounted for pivotal movement about pin 40. Solenoid 41 has its plunger arm 42 pin-connected to the outer end of the longer crank arm 43. Horizontal linkage arms 27a and 27b extending in opposite directions are operatively connected to oppositely extending crank arm members 43 and 44 by pivot pins 45 and 46 respectively. Thus, when the solenoid 41 is energized, the plunger arm 42 moves to the left imparting counterclockwise movement to the crank member 39 and pulling all horizontal linkage arms 27 toward the release activator 28. This movement, as can be seen from the drawings, causes all vertical arms 26 to be pulled down releasing all latches 19 of the system simultaneously.

Although not absolutely necessary, it has been found preferable to provide an electrical interlock connection between the electric motor of the reflector rotation drive system and the release activating solenoid 41. In such a system, when electrical power is applied to the motor of the drive system to move the reflectors 11 away from the "protected" position, power is also automatically applied to the solenoid 41 for a short period to operate the release mechanism 25 just long enough for the locking bar 17 to clear the latch lever 20. Such an arrangement prevents inadvertent application of undue strain or damaging force to the drive system.

Thus, there has been disclosed a locking system for solar collector systems which automatically latches and holds the reflector dishes of an array in a protected position when moved to that position by the motor drive system of the array. When the reflectors 11 are so latched, the motor drive system and rotation axles 12 of the reflectors 11 are effectively isolated from the stress forces of high winds and storms tending to move the reflectors 11 from their protected position. Provision is made to release automatically all of the latches simultaneously when the motor drive system is engaged to remove the reflectors 11 back to their operating positions.

Many changes and modifications of the above disclosed invention still within the spirit of the teachings herein will occur to those skilled in the art and therefore it is intended that this invention be limited only as set forth in the following claims.

What is claimed is:

1. In a maneuverable solar collector array wherein a plurality of concave trough-like reflectors are rotatably supported between support pylon structures by rotation axle means, a latching system for holding said reflectors in a protected position, said latching system having at least one latching device comprising:
   mounting plate means affixed to each reflector of an adjacent pair of reflectors and extending generally toward the lines of focus of said reflectors,
   locking bar means mounted between said mounting plate means positioned intermediate said lines of focus and said rotation axles, said mounting plate means and said locking bar means rotating with said reflectors,
   latching means mounted on said support pylon positioned to engage and hold said locking bar means when said reflectors are rotated to a protected position, said latching means comprising lever means mounted for limited pivotal movement, spring bias means maintaining said lever means at one limit of its pivotal movement, said lever means having a cam surface edge and a notch edge positioned such that when contacted by said locking bar said lever is moved away from said one limit allowing said locking bar to pass by said cam edge and to be received and held in said notch under influence of said spring bias means thereby locking each reflector in a protected position.

2. A latching system as defined in claim 1 including within said array a plurality of said latching devices.

3. A latching system as defined in claim 2 wherein each reflector of said array is connected to at least one of said plurality of latching devices.

4. A latching system as defined in claim 1 wherein said mounting plate means are affixed to edges of said reflectors adjacent the rotation axles.

5. A latching system as defined in claim 1 having a release mechanism linked to said lever means and operative to move said lever means from its latched position when activated and to allow pivotal movement of said lever means without movement of said release mechanism.

6. A latching system as defined in claim 5 wherein said release mechanism includes a pullrod connected to said lever means by pin and slot means.

7. A latching system as defined in claim 6 wherein said release mechanism is operated by a solenoid.

8. A latching system as defined in claim 7 having a plurality of said latching devices and associated release mechanisms and wherein said release mechanisms are linkage connected to operate simultaneously.

9. A latching system as defined in claim 8 wherein said solenoid is electrically interlocked with the reflector motive system of said array whereby said release system is automatically operated upon energization of said motor system to move said array reflectors from said protected position.

10. In a maneuverable solar collector array wherein a plurality of concave trough-like reflectors are rotatably supported between support pylon structures by rotation axle means, a latching system for holding said reflectors in a protected position comprising: a plurality of latching devices each having mounting plate means affixed to the reflectors of an adjacent pair of reflectors and extending generally toward the lines of focus of said reflectors, locking bar means mounted between said mounting plate means on adjacent reflectors and positioned intermediate said lines of focus and said rotation axles, said mounting plate means and said locking bar means rotating with said reflectors, latching means mounted on said support pylon and positioned to engage and hold said locking bar means when said reflectors are rotated to a protected position, said latching means comprising lever means mounted for limited pivotal movement, spring bias means maintaining said lever means at one limit of its pivotal movement, said lever means having a cam surface edge and a notch edge positioned such that when contacted by said locking bar said lever is moved away from said one limit allowing said locking bar to pass by said cam edge and to be received and held in said notch under influence of said spring bias means thereby locking said reflector in a protected position, and release system comprising pull rods connected to each of said levers by pin and slot structure and operative to move said less arms from latched positions when said pull rods are activated and to allow pivotal movement of said lever arms without movement of said release system and solenoid operated system for activating all of said pull rods simultaneously.

11. A latching system as defined in claim 8 wherein said solenoid is electrically interlocked with the reflector motive system of said array whereby said release system is automatically operated upon energization of said motor system to move said reflectors from said protected position.

12. In a maneuverable solar collector having a concave trough-like reflector rotatably supported between support pylon structures by rotation axle means, a latching system for holding said element in a protected position, said latching system having at least one latching device comprising:

mounting plate means affixed to said reflector extending generally toward the line of focus of said reflector, locking bar means mounted on said mounting plate means positioned intermediate said line of focus and said rotation axles, said mounting plate means and said locking bar means rotating with said reflectors, latching means mounted on said support pylon positioned to engage and hold said locking bar means when said reflector is rotated to a protected position, said latching means comprising lever means mounted for limited pivotal movement, spring bias means maintaining said lever means at one limit of its pivotal movement, said lever means having a cam surface edge and a notch edge positioned such that when contacted by said locking bar said lever is moved away from said one limit allowing said locking bar to pass by said cam edge and to be received and held in said notch under influence of said spring bias means thereby locking said reflector in a protected position.

* * * * *